US011035250B2

(12) United States Patent
Sennoun

(10) Patent No.: US 11,035,250 B2
(45) Date of Patent: **\*Jun. 15, 2021**

(54) GAS TURBINE ENGINE FLUID COOLING SYSTEMS AND METHODS OF ASSEMBLING THE SAME

(71) Applicant: General Electric Company, Schenectady, NY (US)

(72) Inventor: Mohammed El Hacin Sennoun, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/292,984

(22) Filed: Mar. 5, 2019

(65) Prior Publication Data

US 2019/0203613 A1 Jul. 4, 2019

Related U.S. Application Data

(63) Continuation of application No. 14/960,800, filed on Dec. 7, 2015, now Pat. No. 10,323,540.

(51) Int. Cl.
*F02C 7/12* (2006.01)
*F01D 25/14* (2006.01)
(Continued)

(52) U.S. Cl.
CPC ............... *F01D 25/14* (2013.01); *F02C 3/04* (2013.01); *F02C 7/06* (2013.01); *F02C 7/12* (2013.01);
(Continued)

(58) Field of Classification Search
CPC ...... F02C 7/12; F02C 7/14; F02C 7/16; F02C 7/18; F02C 9/16; F02C 9/18;
(Continued)

(56) References Cited

U.S. PATENT DOCUMENTS 4,696,156 A 9/1987 Burr et al.
4,892,293 A 1/1990 Kato et al.
(Continued)

FOREIGN PATENT DOCUMENTS

EP 2546472 A2 1/2013
EP 2565396 A2 3/2013

OTHER PUBLICATIONS

Extended European Search Report and Opinion issued in connection with corresponding EP Application No. 16200783.5 dated Apr. 20, 2017.

*Primary Examiner* — Arun Goyal
(74) *Attorney, Agent, or Firm* — Dority & Manning, P.A.

(57) ABSTRACT

A fluid cooling system for use in a gas turbine engine including a fan casing circumscribing a core gas turbine engine includes a heat source configured to transfer heat to a heat transfer fluid and a primary heat exchanger coupled in flow communication with the heat source. The primary heat exchanger is configured to channel the heat transfer fluid therethrough and is coupled to the fan casing. The fluid cooling system also includes a secondary heat exchanger coupled in flow communication with the primary heat exchanger. The secondary heat exchanger is configured to channel the heat transfer fluid therethrough and is coupled to the core gas turbine engine. The fluid cooling system also includes a bypass mechanism coupled in flow communication with the secondary heat exchanger. The bypass mechanism is selectively moveable based on a temperature of a fluid medium to control a cooling airflow through the secondary heat exchanger.

16 Claims, 5 Drawing Sheets

(51) Int. Cl.
*F02K 3/06* (2006.01)
*F02C 7/06* (2006.01)
*F02C 7/14* (2006.01)
*F02C 7/18* (2006.01)
*F02C 9/16* (2006.01)
*F02C 3/04* (2006.01)
*F02C 9/18* (2006.01)
*F04D 29/52* (2006.01)

(52) U.S. Cl.
CPC .............. *F02C 7/14* (2013.01); *F02C 7/18* (2013.01); *F02C 9/16* (2013.01); *F02C 9/18* (2013.01); *F02K 3/06* (2013.01); *F04D 29/522* (2013.01); *F05D 2220/32* (2013.01); *F05D 2260/213* (2013.01); *F05D 2260/606* (2013.01); *F05D 2270/07* (2013.01); *F05D 2270/303* (2013.01); *Y02T 50/60* (2013.01)

(58) Field of Classification Search
CPC ......... F05D 2260/212; F05D 2260/606; F05D 2270/303
See application file for complete search history.

(56) References Cited

U.S. PATENT DOCUMENTS

| | | |
|---|---|---|
| 5,147,015 A | 9/1992 | Snuttjer et al. |
| 6,651,441 B2 | 11/2003 | Reuter et al. |
| 6,832,484 B2 | 12/2004 | Hofmann et al. |
| 8,776,952 B2 | 7/2014 | Schwarz et al. |
| 2012/0125594 A1 | 5/2012 | Elder |
| 2013/0186102 A1 | 7/2013 | Lo |
| 2014/0027102 A1 | 1/2014 | Antel, Jr. et al. |
| 2014/0205446 A1 | 7/2014 | Patsouris et al. |
| 2015/0167555 A1 | 6/2015 | Mottet et al. |

GAS TURBINE ENGINE FLUID COOLING SYSTEMS AND METHODS OF ASSEMBLING THE SAME

BACKGROUND

The application described herein relates generally to gas turbine engines, and more specifically to fluid cooling systems for gas turbine engines.

Gas turbine engines typically include an inlet, a fan, low and high pressure compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as producing useful work to propel an aircraft in flight or to power a load, such as an electrical generator.

During engine operation, significant heat is produced which raises the temperature of engine systems to unacceptable levels. Various lubrication systems are utilized to facilitate lubricating components within the gas turbine engine. The lubrication systems are configured to channel lubrication fluid to various bearing assemblies within the gas turbine engine and to at least one external generator. During operation, heat generated by components like bearings and seals within the engine and generator is transmitted to the lubrication fluid. To facilitate reducing the operational temperature of the lubrication fluid, at least one known gas turbine engine utilizes one of surface coolers or brick coolers to cool the fluid circulating within.

At least some known turbine engines include surface coolers that are designed and sized to cool engine fluid during various predetermined operating conditions. Specifically, when used in an aircraft engine, at least some surface coolers are engineered to operate during standard day, hot day, and extreme hot day operation to ensure proper cooling of the engine fluid. Generally, the hotter the temperature of the engine fluid, the larger the surface cooler must be to reduce the temperature of the engine fluid. As such, extreme hot day conditions require a relatively large surface cooler as compared to the size of the surface needed for standard day or hot day operation. Because the size of the surface cooler is not variable, at least some known turbine engines include surface coolers sized to reduce engine fluid temperature to a predetermined temperature during extreme hot day conditions.

However, only approximately 0.1% of the turbine engine operating time occurs during extreme hot day conditions. Accordingly, at least some known turbine engines include surface coolers that are larger than actually required a vast majority of the time. Such overcapacity increases the weight of the aircraft and, therefore, reduces the fuel efficiency. In addition, the larger than necessary surface coolers occupy space within the turbine engine that may be used for a different purpose.

BRIEF DESCRIPTION

In one aspect, a fluid cooling system for use in a gas turbine engine including a core gas turbine engine having an axis of rotation and a fan casing substantially circumscribing the core gas turbine engine is provided. The fluid cooling system includes a heat source configured to transfer heat to a heat transfer fluid and a primary heat exchanger coupled in flow communication with the heat source. The primary heat exchanger is configured to channel the heat transfer fluid therethrough and is coupled to the fan casing. The fluid cooling system also includes a secondary heat exchanger coupled in flow communication with the primary heat exchanger. The secondary heat exchanger is configured to channel the heat transfer fluid therethrough and is coupled to the core gas turbine engine. The fluid cooling system also includes a bypass mechanism coupled in flow communication with the secondary heat exchanger. The bypass mechanism is selectively moveable based on a temperature of a fluid medium to control cooling airflow through the secondary heat exchanger.

In another aspect, a method operating a gas turbine engine is provided. The method includes transferring heat from a heat source to a heat transfer fluid and channeling the heat transfer fluid through a primary heat exchanger coupled in flow communication with the heat source. The method also includes determining a temperature of a fluid medium and controlling a bypass mechanism to selectively position a secondary heat exchanger in a cooling airflow based on the temperature of the fluid medium.

DETAILED DESCRIPTION

Figure 1:
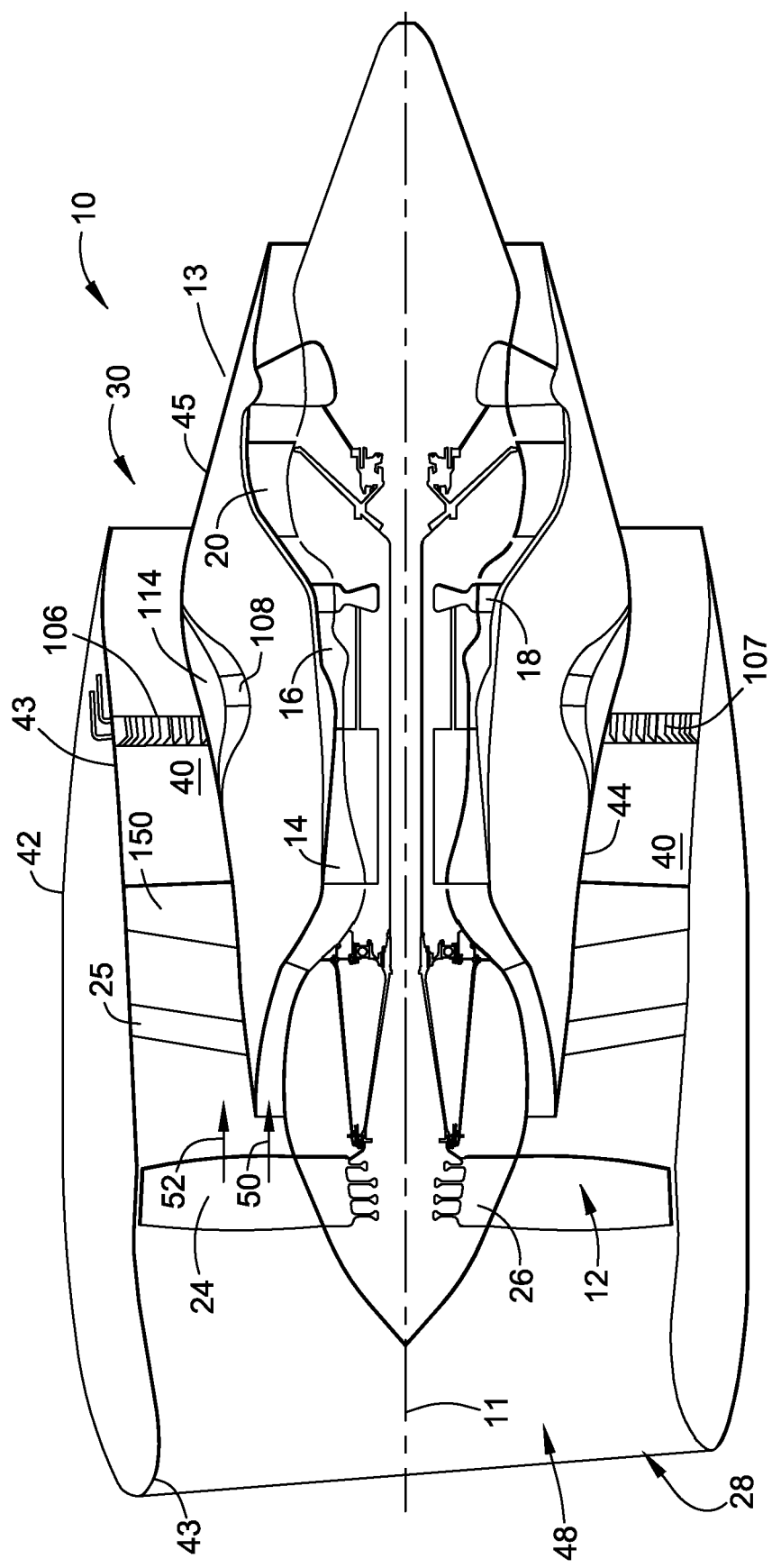
FIG. 1 is a schematic illustration of an exemplary gas turbine engine.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged;

such ranges are identified and include all the sub-ranges contained therein unless context or language indicates otherwise.

As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extends substantially parallel to a centerline of the turbine engine. Moreover, the terms "radial" and "radially" refer to directions and orientations that extends substantially perpendicular to the centerline of the turbine engine.

The exemplary systems and methods described herein relate to oil cooling systems that overcome at least some disadvantages of known systems and methods for cooling lubrication oil circulating through a gas turbine engine. Moreover, the systems and methods described herein include both a surface cooler and a brick cooler that cooperate to cool the lubrication oil. More specifically, the surface cooler described herein is designed to satisfy the cooling requirements of the lubrication fluid during engine operating conditions up to and including hot day conditions. As such, when the operating condition is determined to be an extreme hot day condition, further cooling of the lubrication oil is required. The brick cooler is positioned in the undercowl region of the engine and is activated upon a determination that the current operating condition of the engine is extreme hot day conditions. More specifically, the bypass mechanism is selectively moveable based on the temperature of a fluid medium to control the cooling airflow through the brick cooler.

Advantages of the oil cooling system and methods described herein include the reduction in size of the surface cooler leads to a reduction in overall weight of the engine. Furthermore, the smaller surface cooler has a smaller footprint in the engine and interacts with a correspondingly smaller amount of the inlet air. As such, not only does the smaller surface cooler allow more space within the engine for additional components, but the pressure losses of the fan air is reduced due to less air interacting with the smaller surface cooler. The reductions in weight, and also the reduction in pressure losses, result in an improved specific fuel consumption rate, which increases the efficiency of the engine and reduces overall operating costs.

Embodiments disclosed herein relate to surface coolers and more particularly to enhanced surface coolers for use in a nacelle of an engine such as an aircraft engine. The exemplary surface coolers may be used for providing efficient cooling. Further, the term "surface coolers" as used herein may be used interchangeably with the term "heat exchangers". As used herein, the surface coolers are applicable to various types of turbomachinery applications such as, but not limited to, turbojets, turbo fans, turbo propulsion engines, aircraft engines, gas turbines, steam turbines, wind turbines, and water turbines. In addition, as used herein, singular forms such as "a", "an", and "the" include plural referents unless the context clearly dictates otherwise.

FIG. 1 is a schematic illustration of an exemplary gas turbine engine assembly 10 having a longitudinal axis 11. Gas turbine engine assembly 10 includes a fan assembly 12, and a core gas turbine engine 13. Core gas turbine engine 13 includes a high pressure compressor 14, a combustor 16, and a high pressure turbine 18. In the exemplary embodiment, gas turbine engine assembly 10 may also include a low pressure turbine 20. Fan assembly 12 includes an array of fan blades 24 extending radially outward from a rotor disk 26. Engine 10 has an intake side 28 and an exhaust side 30. Gas turbine engine assembly 10 also includes a plurality of bearing assemblies (not shown in FIG. 1) that are utilized to provide rotational and axial support to fan assembly 12, compressor 14, high pressure turbine 18 and low pressure turbine 20, for example.

In operation, air flows through fan assembly 12 and is split by an airflow splitter 44 into a first portion 50 and a second portion 52. First portion 50 of the airflow is channeled through compressor 14 wherein the airflow is further compressed and delivered to combustor 16. Hot products of combustion (not shown in FIG. 1) from combustor 16 are utilized to drive turbines 18 and 20 and thus produce engine thrust. Gas turbine engine assembly 10 also includes a bypass duct 40 that is utilized to bypass a second portion 52 of the airflow discharged from fan assembly 12 around core gas turbine engine 13. More specifically, bypass duct 40 extends between an inner wall 43 of a fan casing or shroud 42 and an outer wall 45 of splitter 44.

Figure 2:
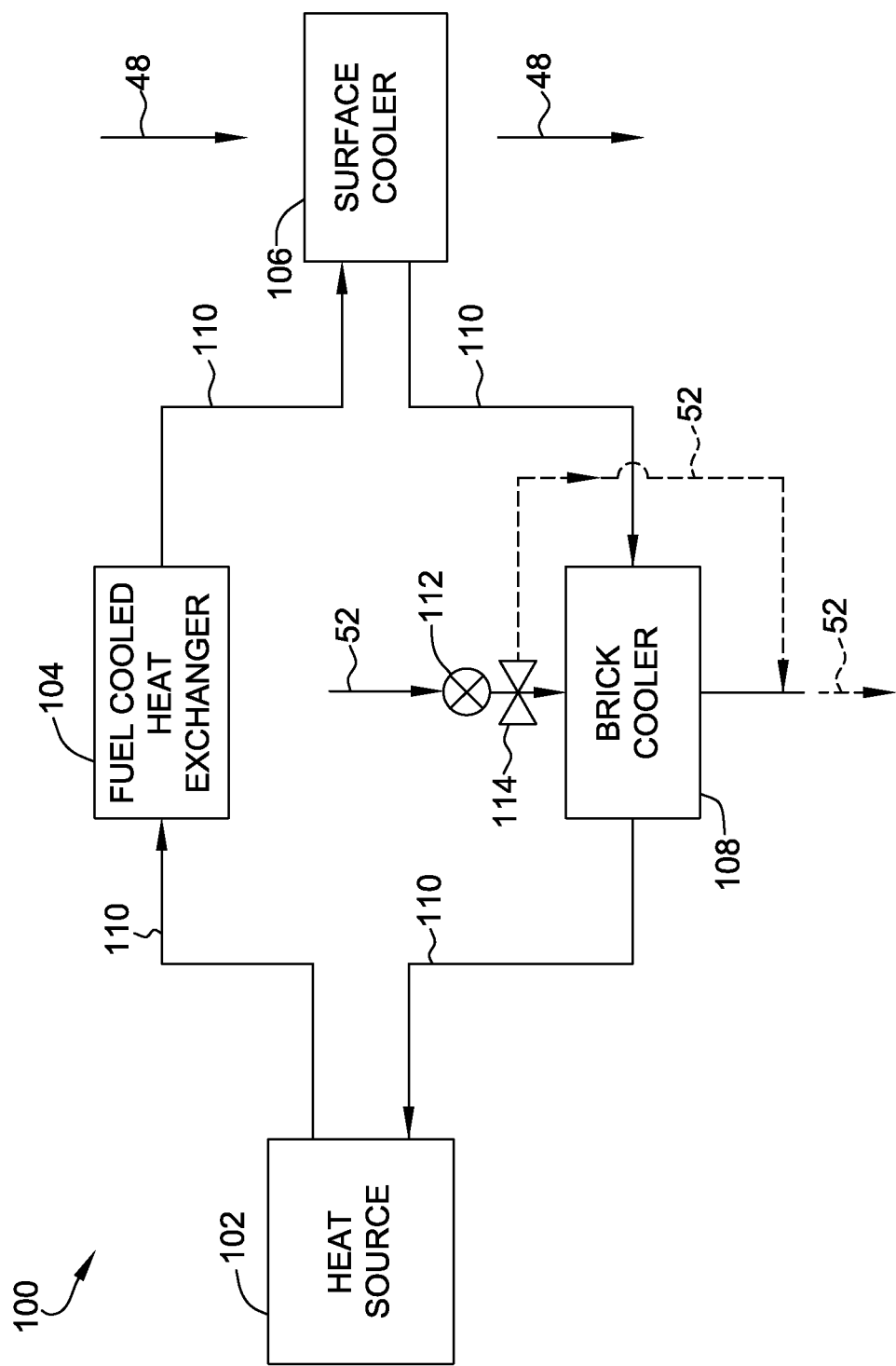
FIG. 2 is a schematic illustration of exemplary engine fluid cooling system that may be utilized with the gas turbine engine shown in FIG. 1.

FIG. 2 is a schematic illustration of exemplary engine fluid cooling system 100 that may be utilized with gas turbine engine 10 (shown in FIG. 1). In the exemplary embodiment, fluid cooling system 100 includes a heat source 102, a fuel cooled air-oil cooler (FCOC) heat exchanger 104, a primary air-oil cooler (ACOC) heat exchanger 106, and a secondary air-oil cooler (ACOC) heat exchanger 108 all coupled in flow communication to each other via an engine fluid conduit 110. Heat source 102 includes core gas turbine engine 13, which transfers heat to an engine fluid, such as lubrication oil. More specifically, heat source 102 includes any of a generator, a gearbox, a pump, or bearing within core gas turbine engine 13 that generates heat during operation and requires lubrication oil for cooling purposes. Alternatively, heat source 102 in system 100 includes any component of engine 10 that facilitates operation of system 100 as described herein. The engine lubricating fluid flows though system 100 via conduit 110 and returns to heat source 102. The temperature of the lubrication oil is reduced as it flows through heat exchangers 104, 106, and 108.

Although cooling system 100 is described herein to cool lubrication fluid for engine 10, it may alternatively or simultaneously cool other fluids. For example, it may cool a fluid used to extract heat from actuators used on the engine. It may also be used to cool fluids which extract heat from electronic apparatus such as engine controls. In addition to cooling a wide variety of fluids utilized by a gas turbine engine assembly, it should be realized that cooling system 100, and the methods described herein illustrate that cooling system 100 may also cool an apparatus that is mounted on the airframe, and not part of the engine. In other applications, cooling system 100 may be mounted remotely from gas turbine engine 10, for example on an external surface of the aircraft.

In the exemplary embodiment, fuel cooled heat exchanger 104 coupled in flow communication with heat source 102. Heat exchanger 104 includes a circuit of relatively cool fuel flowing therethrough that reduces the temperature of the lubrication oil as it also flows through heat exchanger 104.

In the exemplary embodiment, primary heat exchanger 106 includes an air cooled surface cooler positioned within a recess formed in inner surface 43 of fan casing 42. Surface cooler 106 includes a plurality of fins 107 that are thermally coupled to receive thermal energy from the oil and transfer the energy to another medium such as air. More specifically, surface cooler 106 is flush mounted to fan casing 42 such that fins 107 extend into an inlet airflow 48 within intake side 28 of engine 10. Surface cooler 106 transfers the thermal energy from the oil into inlet airflow 48 that removes the heat from the oil. The cooled oil is channeled from surface cooler 106 through conduit 110 to secondary heat exchanger 108 for additional cooling if required, as described in further detail below.

As shown in FIG. 1, surface cooler 106 is coupled to inner wall 43 of fan casing 42 downstream from fan assembly 12, such that air channeled into intake side 28 is first channeled through fan assembly 12 prior to being supplied to surface cooler 106 aft of outlet guide vanes 150 to facilitate reducing the operating temperature of the engine fluids channeled through surface cooler 106. Generally, surface cooler 106 is positioned anywhere along the axial length of inner wall 43 of fan casing 42, or along radially outer surface 45 of splitter 44 within bypass duct 40. In the exemplary embodiment, efficiency is increased when surface cooler 106 is positioned adjacent engine intake side 28, where a diameter of fan assembly 12 is largest.

Typically, air-oil coolers are sized at extreme hot day conditions where the ambient temperature is approximately 131.degree. F., as shown in Table 1. In the exemplary embodiment, surface cooler 106 is smaller in size than conventional surface coolers that are sized for extreme hot day conditions. More specifically, surface cooler 106 is sized for operation up to and including standard day operation or up to and including hot day operating conditions based on a temperature of a fluid medium as defined in Table 1 below. Although Table 1 describes the fluid medium as an ambient airflow, in other embodiments, the fluid medium may be the lubrication oil itself. As such, smaller size surface cooler 106 satisfies cooling requirements of the lubrication oil during operating conditions up to and including either standard day operation or hot day operation.

TABLE 1

| Operating Condition | Ambient Temp |
| --- | --- |
| Extreme Hot Day | 131° F. (55° C.) |
| Hot Day | 105° F. (40.5° C.) |
| Standard Day | 59° F. (15° C.) |
| Cold Day | 34° F. (1° C.) |
| Extreme Cold Day | −65° F. (−54° C.) |

Table 1 above describes the possible conditions under which engine 10 operates. As described above, known surface coolers are engineered to operate during standard day, hot day, and extreme hot day operation to ensure proper cooling of the lubrication oil. Generally, the higher the ambient temperature, the higher the temperature of the lubrication oil, the larger the surface cooler must be to reduce the temperature of the lubrication oil. As such, extreme hot day conditions require a relatively large surface cooler as compared to the size of the surface needed for standard day or hot day operation. However, only approximately 0.1% of the turbine engine operating time occurs during extreme hot day conditions. Accordingly, at least some known turbine engines include surface coolers that are larger than actually required 99.9% of the time. Such over-capacity increases the weight of the aircraft and, therefore, reduces the fuel efficiency. In addition, the larger than necessary surface coolers occupy space within the turbine engine that may be used for a different purpose.

In the exemplary embodiment, surface cooler 106 is sized for operation during either standard day or hot day operating conditions as defined in Table 1 below. That is, smaller size surface cooler 106 satisfies cooling requirements of the lubrication oil during operating conditions up to and including either standard day or hot day operation. As such, when the operating condition is determined to be an extreme hot day condition, further cooling of the lubrication oil is required. More specifically, when surface cooler 106 is sized for standard day operation, additional cooling is needed to cool the lubrication oil to a desired temperature when the engine is operating at hot day conditions or above. Similarly, when surface cooler 106 is sized for hot day operation, surface cooler 106 provides sufficient cooling for standard day operation, but additional cooling is needed to cool the lubrication oil to a desired temperature when the engine is operating at extreme hot day conditions.

Figure 4:
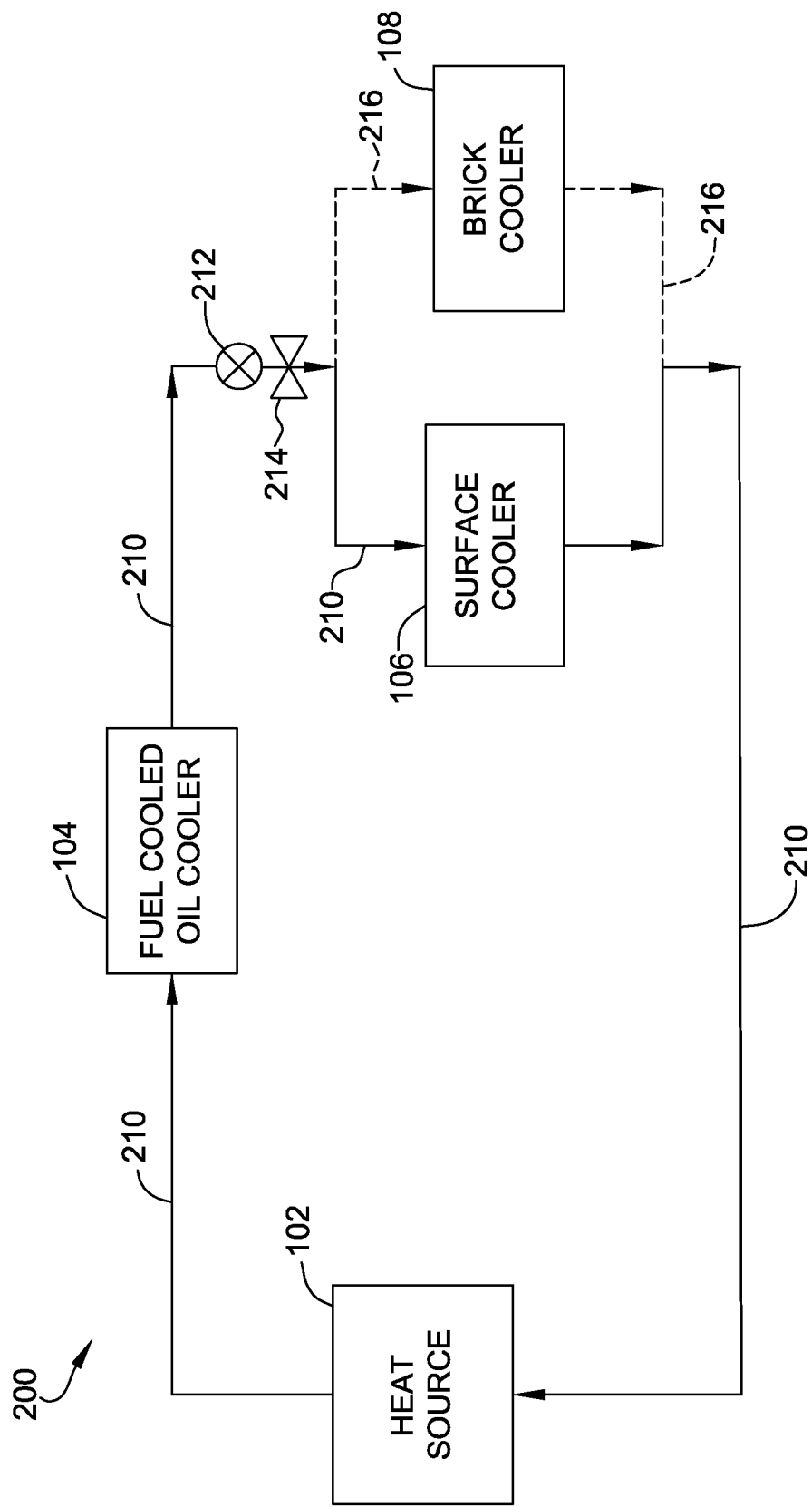
FIG. 4 is a schematic illustration of an alternative engine fluid cooling system that may be utilized with gas turbine engine shown in FIG. 1.

In the exemplary embodiment, secondary heat exchanger 108 is coupled in flow communication with surface cooler 106 such that lubrication fluid is channeled therethrough and includes a brick cooler coupled to core turbine engine 13. More specifically, brick cooler 108 is coupled to outer surface 45 and selectively exposed to bypass flow 52 based on the operating condition of engine 10. Similar to surface cooler 106, brick cooler 108 is also smaller in size than a conventional brick cooler. More specifically, brick cooler 108 is sized to operate in combination with surface cooler 106 such that surface cooler 106 and brick cooler 108 together reduce the temperature of the lubrication oil flowing therethrough at least as much as a conventional size surface cooler or brick cooler. As shown in FIG. 2, surface cooler 106 and brick cooler 108 are coupled in series with one another. In an alternative embodiment, surface cooler 106 and brick cooler 108 are coupled in parallel (as shown in FIG. 4). As described herein, brick cooler 108 is only exposed to a cooling airflow during extreme hot day operating conditions.

Figure 3:
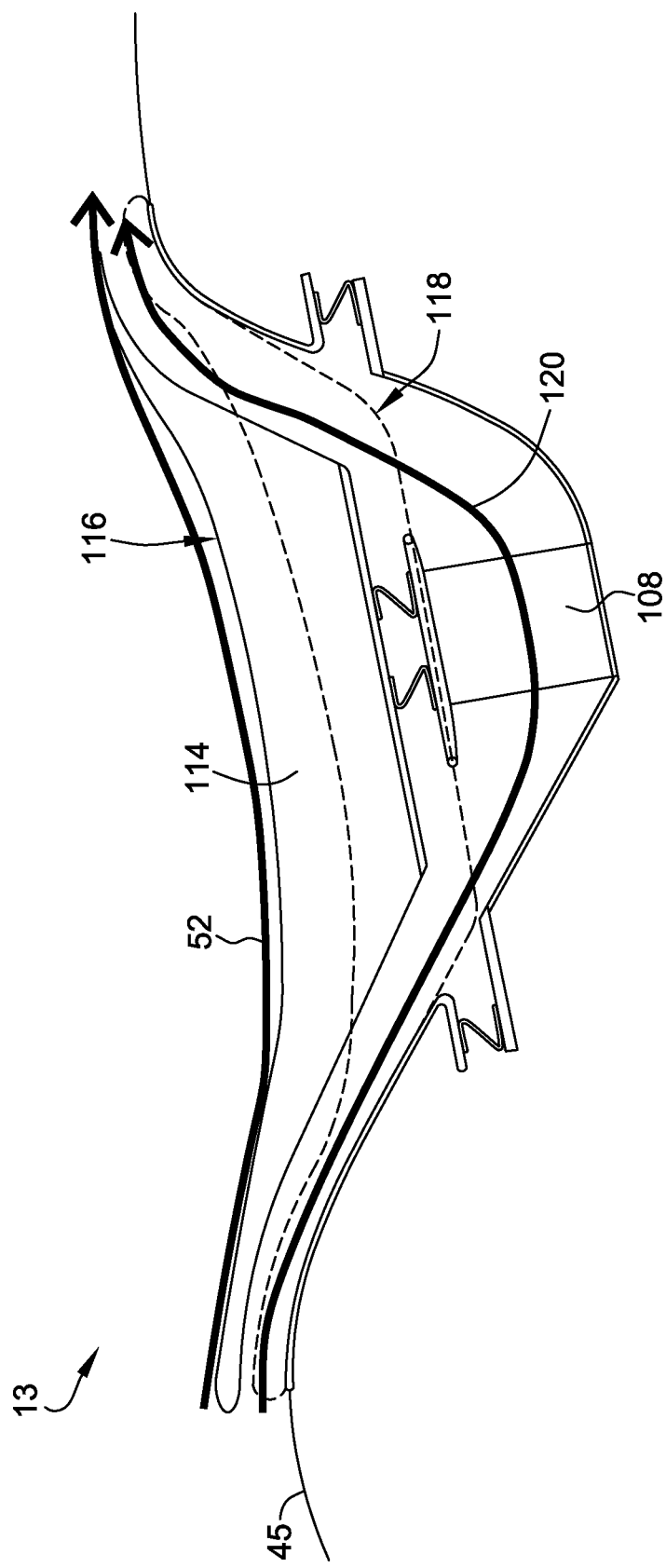
FIG. 3 is an enlarged view of a portion of gas turbine engine shown in FIG. 1 illustrating an exemplary brick cooler mechanism.

Referring now to FIGS. 2 and 3, cooling system 100 also includes a temperature sensor 112 and a bypass mechanism 114 coupled in flow communication with brick cooler 108. In the exemplary embodiment, bypass mechanism 114 is selectively moveable between a first position 116 and a second position 118 (shown in broken lines in FIG. 3) based on a temperature of the fluid medium, as measured by sensor 112, to control a cooling airflow 120 through brick cooler 108. More specifically, bypass mechanism 114 includes a flap or a door that is selectively moveable to expose brick cooler 108 to cooling airflow 120 in response to the temperature of the fluid medium being above a predetermined threshold temperature. Even more specifically, when the threshold temperature as measured by sensor 112 is exceeded, indicating either of hot day or extreme hot day conditions, bypass mechanism 114 is controlled to move into first position 116 to expose brick cooler 108 to cooling airflow 120. Similarly, when the measured temperature is below the threshold temperature, indicating an operating condition that is not either hot day or extreme hot day condition, bypass mechanism 114 is controlled to move into second position 118 to isolate brick cooler 108 from cooling airflow 120.

In the exemplary embodiment, bypass mechanism 114 includes a flap or a door that extends into bypass airflow 54 when the threshold temperature is exceeded and either hot day or extreme hot day conditions are determined. In such a configuration, bypass mechanism 114 channels a portion of bypass airflow 52 through brick cooler 108 as cooling airflow 120 before channeling cooling airflow 120 back to bypass airflow 52 downstream of brick cooler 108 Although FIG. 2 illustrates sensor measuring a temperature of bypass airflow 52 as the fluid medium on which the position of bypass mechanism 114 is based, in another embodiment, the fluid medium being measured is one inlet flow 48 or the lubrication oil itself flowing though conduit 110 of system 100. Generally, the fluid medium on which the position of bypass mechanism 114 is based includes any engine fluid that is indicative of an operating condition of engine 10 as set forth in Table 1. In the exemplary embodiment, the threshold temperature of the ambient airflow fluid medium is based on the size of surface cooler. For example, when surface cooler 106 is sized for standard day operation, the threshold temperature may be approximately 60.degree. F. (15.5. degree. C.) such that the lubrication fluid is channeled through brick cooler 108 upon the determination of the temperature being greater than the standard day conditions, indicating one of hot day and extreme hot day operation. Similarly, when surface cooler 106 is sized for hot day operation, the threshold temperature may be approximately 105. degree. F. (40.5. degree. C.) such that the lubrication fluid is channeled through brick cooler 108 upon the determination of the temperature being greater than the hot day conditions, indicating extreme hot day operation. Alternatively, the threshold temperature may be any temperature that facilitates operation of system 100 as described herein.

In an alternative embodiment, mechanism 114 is permanently in the first position 116 as shown in solid lines in FIG. 3 and bypass mechanism 114 includes an additional flap or door (not shown) that selectively covers an inlet defined between bypass mechanism 114 and outer wall 45. As such, the flap is selectively movable based on a temperature of the fluid medium, as measured by sensor 112, to control cooling airflow 120 through brick cooler 108.

In the exemplary embodiment, the lubrication oil is channeled through brick cooler 108 in all operating conditions, including when bypass mechanism is in the second position and brick cooler 108 is not exposed to a cooling flow. Alternatively, cooling system 100 includes a lubrication oil bypass mechanism and associated lubrication oil bypass conduit (neither shown) that operate to channel the lubrication oil around brick cooler 108 during certain operating conditions. More specifically, the lubrication oil bypass mechanism and associated lubrication oil bypass conduit channel the lubrication oil around brick cooler 108 during operating conditions when the measured temperature is below the threshold temperature, indicating an operating condition that is not either hot day or extreme hot day condition. Similarly, cooling system 100 includes a second lubrication oil bypass mechanism and associated second lubrication oil bypass conduit (neither shown) that operate to channel the lubrication oil around surface cooler 106 during certain operating conditions. More specifically, the second lubrication oil bypass mechanism and associated second lubrication oil bypass conduit channel the lubrication oil around surface cooler 106 during operating conditions when the lubrication oil does not require cooling, such as extreme cold day conditions.

In operation, heat source 102 generates heat and transfers the thermal energy to the lubrication oil, which is then channeled through conduit 110 to fuel cooled oil cooler for reducing the temperature of the lubrication oil. The lubrication oil is then channeled through surface cooler 106 coupled to fan casing 42. Surface cooler 106 is exposed to inlet airflow 48 such that thermal energy from the lubrication oil is transferred to inlet airflow. As described herein, in the exemplary embodiment, surface cooler 106 is smaller in size than conventional surface coolers and is designed to satisfy the cooling requirements of the lubrication oil for operating conditions of engine 10 up to and including hot day conditions. Sensor 112 then measures the temperature of a fluid medium, such as one of airflows 48 or 52 or the lubrication oil itself. The measured temperature of the fluid medium is then compared to a predetermined threshold temperature that is associated with the operating condition of engine 10. When the measured temperature is below the threshold temperature, engine 10 is not operating in one of hot day or extreme hot day conditions and bypass mechanism 114 is positioned in second position 118 to allow bypass airflow 51 to bypass brick cooler 108. Alternatively, when the measured temperature is at or above the threshold temperature, engine 10 is operating in one of hot day or extreme hot day conditions and bypass mechanism 114 is positioned in first position 116 to allow a portion of bypass airflow 51, i.e. cooling airflow 120, to flow through brick cooler 108 and transfer thermal energy from the lubrication oil therein to cooling airflow 120.

FIG. 4 is a schematic illustration of an alternative engine fluid cooling system 200 that may be utilized with gas turbine engine 10 (shown in FIG. 1). Fluid cooling system 200 includes the same components as cooling system 100, only arranged in parallel rather than in series. As such, FIG. 4 uses like reference numerals for components in system 200 that are identical to those in system 100. Heat source 102, fuel cooled air-oil cooler (FCOC), heat exchanger 104, and primary air-oil cooler (ACOC) heat exchanger 106, are all coupled in flow communication to each other via an engine fluid conduit 210. Cooling system 200 includes a bypass conduit 216 that couples secondary air-oil cooler (ACOC) heat exchanger 108 in parallel with heat exchanger 106. The engine lubricating fluid flows though system 200 via conduit 210, and selectively 216, and returns to heat source 102. The temperature of the lubrication oil is reduced as it flows through heat exchangers 104, 106, and 108.

Figure 5:
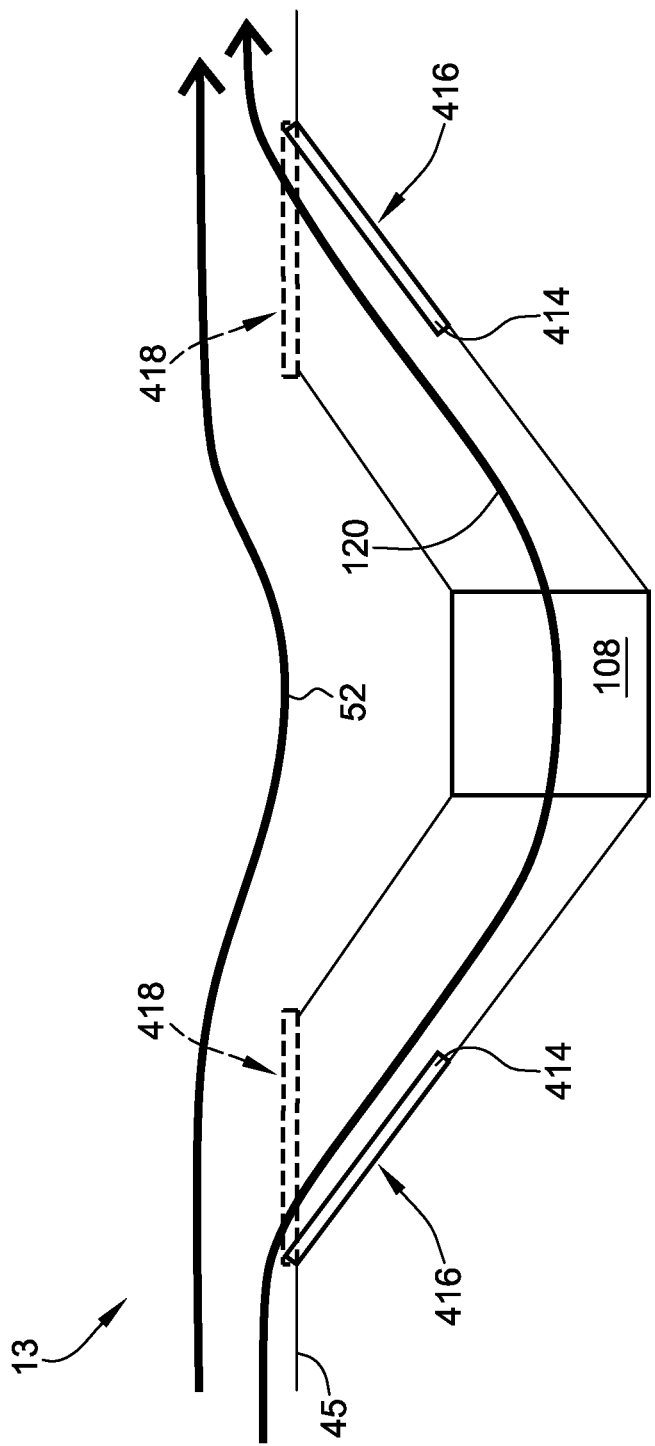
FIG. 5 is an enlarged view of a portion of gas turbine engine shown in FIG. 1 illustrating an alternative brick cooler mechanism.

FIG. 5 illustrates an alternative bypass mechanism 414 coupled in flow communication with brick cooler 108. Similar to bypass mechanism 114 above, bypass mechanism 414 is selectively moveable between a first position 416 and a second position 418 (shown in broken lines in FIG. 5) based on a temperature of the fluid medium, as measured by sensor 112, to control a cooling airflow 120 through brick cooler 108. More specifically, bypass mechanism 414 includes two flaps or doors that are selectively moveable to expose brick cooler 108 to cooling airflow 120 in response to the temperature of the fluid medium being above a predetermined threshold temperature. Even more specifically, when the threshold temperature as measured by sensor 112 is exceeded, indicating either of hot day or extreme hot day conditions, bypass mechanisms 414 are controlled to move into first position 416 to expose brick cooler 108 to cooling airflow 120. Similarly, when the measured temperature is below the threshold temperature, indicating an operating condition that is not either hot day or extreme hot day condition, bypass mechanism 414 are controlled to move into second position 418 to isolate brick cooler 108 from cooling airflow 120.

In one embodiment, bypass mechanisms 414 includes one flap or door upstream of brick cooler 108 and a second flap or door downstream of brick cooler 108. Flaps 414 move to enable bypass airflow 54 to become cooling airflow 120 through brick cooler 108 when the threshold temperature is exceeded and either hot day or extreme hot day conditions are determined. In such a configuration, bypass mechanism 414 channels a portion of bypass airflow 52 through brick cooler 108 as cooling airflow 120 before channeling cooling airflow 120 back to bypass airflow 52 downstream of brick cooler 108.

Although cooling system 200 is described herein to cool lubrication fluid for engine 10, it may alternatively or simultaneously cool other fluids. For example, it may cool a fluid used to extract heat from actuators used on the engine. It may also be used to cool fluids which extract heat from electronic apparatus such as engine controls. In addition to cooling a wide variety of fluids utilized by a gas turbine engine assembly, it should be realized that cooling system 200, and the methods described herein illustrate that cooling system 200 may also cool an apparatus that is mounted on the airframe, and not part of the engine. In other applications, cooling system 200 may be mounted remotely from gas turbine engine 10, for example on an external surface of the aircraft.

In the exemplary embodiment, fuel cooled heat exchanger 104 coupled in flow communication with heat source 102. Heat exchanger 104 includes a circuit of relatively cool fuel flowing therethrough that reduces the temperature of the lubrication oil as it also flows through heat exchanger 104.

In the exemplary embodiment, primary heat exchanger 106 includes an air cooled surface cooler positioned within a recess formed in inner surface 43 of fan casing 42. Surface cooler 106 includes a plurality of fins 107 that are thermally coupled to receive thermal energy from the oil and transfer the energy to another medium such as air. More specifically, surface cooler 106 is flush mounted to fan casing 42 such that fins 107 extend into an inlet airflow 48 within intake side 28 of engine 10. Surface cooler 106 transfers the thermal energy from the oil into inlet airflow 48 that removes the heat from the oil.

As shown in FIG. 1, surface cooler 106 is coupled to inner wall 43 of fan casing 42 downstream from fan assembly 12, such that air channeled into intake side 28 is first channeled through fan assembly 12 prior to being supplied to surface cooler 106 aft of outlet guide vanes 150 to facilitate reducing the operating temperature of the engine fluids channeled through surface cooler 106. Generally, surface cooler 106 is positioned anywhere along the axial length of inner wall 43 of fan casing 42, or along radially outer surface 45 of splitter 44 within bypass duct 40. In the exemplary embodiment, efficiency is increased when surface cooler 106 is positioned adjacent engine intake side 28, where a diameter of fan assembly 12 is largest.

Referring now to FIG. 4, cooling system 200 also includes a temperature sensor 212 and a bypass mechanism 214 coupled in along conduit 210. Bypass mechanism 214 is selectively moveable based on a temperature of the fluid medium, as measured by sensor 212, to control lubrication oil flow through brick cooler 108. More specifically, when the threshold temperature as measured by sensor 212 is exceeded, indicating either of hot day or extreme hot day conditions, bypass mechanism 114 is controlled to move to channel lubrication oil through brick cooler 108. Similarly, when the measured temperature is below the threshold temperature, indicating an operating condition that is not either hot day or extreme hot day condition, bypass mechanism 114 is controlled to restrict lubrication oil flow through only surface cooler 106.

In operation, heat source 102 generates heat and transfers the thermal energy to the lubrication oil, which is then channeled through conduit 210 to fuel cooled oil cooler 104 for reducing the temperature of the lubrication oil. The lubrication oil is then channeled along conduit 210 where it reaches sensor 212 and bypass mechanism 214. Sensor 212 determines the temperature of the lubrication fluid and controls bypass mechanism 214 based on the temperature determination. In cases where the temperature is below a predetermined threshold, bypass mechanism 214 is actuated to channel all of the lubrication oil through surface cooler 106 and onward to heat source 102. However, in cases where the temperature is determined by sensor 212 to be above the threshold, then bypass mechanism 214 is controlled to split the flow of lubrication oil such that a portion is channeled through surface cooler 106 and a portion is channeled through brick cooler 108. After the lubrication oil exits the coolers 106 and 108, it is combined and channeled to heat source 102 for use.

The exemplary apparatus and methods described herein overcome at least some disadvantages of known systems and methods for cooling a lubrication oil through a gas turbine engine. Moreover, the systems and methods described herein include both a surface cooler and a brick cooler that cooperate to cool the lubrication oil. More specifically, the surface cooler described herein is designed to satisfy the cooling requirements of the lubrication fluid during engine operating conditions up to and including hot day conditions, as specified in Table 1 above. As such, when the operating condition is determined to be an extreme hot day condition, further cooling of the lubrication oil is required. The brick cooler is positioned in the undercowl region of the engine and is activated upon a determination that the current operating condition of the engine is extreme hot day conditions. More specifically, the bypass mechanism is selectively moveable based on the temperature of a fluid medium to control the cooling airflow through the brick cooler.

A technical effect of the above described oil cooling system is that the reduction in size of the surface cooler leads to a reduction in overall weight of the engine. Furthermore, the smaller surface cooler has a smaller footprint in the engine and interacts with a correspondingly smaller amount of the inlet air. As such, not only does the smaller surface cooler allow more space within the engine for additional components, but the pressure losses of the fan air is reduced due to less air interacting with the smaller surface cooler. The reduction in weight and also the reduction in differential pressure result in an improved specific fuel consumption rate, which increases the efficiency of the engine and reduces overall operating costs.

Exemplary embodiments of oil cooling systems are described above in detail. The oil cooling systems, and methods of operating such systems and devices are not limited to the specific embodiments described herein, but rather, components of systems and/or steps of the methods may be utilized independently and separately from other components and/or steps described herein. For example, the methods may also be used in combination with other systems requiring oil cooling systems, and are not limited to practice with only the turbine engine system and methods as described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fluid cooling system for use in a gas turbine engine including a core section of the gas turbine engine having an axis of rotation and a fan casing substantially circumscribing the core section of the gas turbine engine, said fluid cooling system comprising:
    a heat source configured to transfer heat to a heat transfer fluid;
    a primary heat exchanger coupled in flow communication with said heat source and configured to channel the heat transfer fluid therethrough, said primary heat exchanger coupled to the fan casing;
    a secondary heat exchanger coupled in flow communication with said primary heat exchanger and configured to channel the heat transfer fluid therethrough, said secondary heat exchanger located within the core section of the gas turbine engine;
    a bypass mechanism coupled in flow communication with said secondary heat exchanger, said bypass mechanism being selectively moveable based on a temperature of an ambient airflow to control a cooling airflow through said secondary heat exchanger;
    a temperature sensor to measure the temperature of the ambient airflow, wherein when the temperature of the ambient airflow exceeds a threshold temperature, said bypass mechanism moves to expose said secondary heat exchanger to the cooling airflow.

2. The fluid cooling system in accordance with claim 1, wherein said primary heat exchanger comprises a surface cooler coupled within a recess located in a radially interior surface of the fan casing, and wherein said secondary heat exchanger comprises a brick cooler.

3. The fluid cooling system in accordance with claim 1, wherein said primary heat exchanger comprises a surface cooler sized for operating conditions including standard operation and hot day operation.

4. The fluid cooling system in accordance with claim 1, wherein said bypass mechanism comprises a flap that is selectively moveable between a first position and a second position based on the temperature of the ambient airflow.

5. The fluid cooling system in accordance with claim 4, wherein said bypass mechanism exposes said secondary heat exchanger to the cooling airflow in the first position and isolates said secondary heat exchanger from the cooling airflow in the second position.

6. The fluid cooling system in accordance with claim 5, wherein said bypass mechanism is in the first position when the temperature of the ambient airflow is above a threshold temperature, and wherein said bypass mechanism is in the second position when the temperature of the ambient airflow is below a threshold temperature.

7. The fluid cooling system in accordance with claim 1, further comprising a fuel cooled heat exchanger coupled in flow communication with said heat source, said primary heat exchanger, and said secondary heat exchanger.

8. A method of operating a gas turbine engine having a core section and a fan casing substantially circumscribing the core section, said method comprising:
    transferring heat from a heat source to a heat transfer fluid; channeling the heat transfer fluid through a primary heat exchanger coupled in flow communication with said heat source; using a temperature sensor to measure a temperature of an ambient airflow; and controlling a bypass mechanism, coupled in flow communication with a secondary heat exchanger located within the core section of the gas turbine engine, selectively exposing the secondary heat exchanger to a cooling airflow in response to the temperature of the ambient airflow being above a threshold temperature.

9. The method according to claim 8, wherein the controlling the bypass mechanism comprises selectively moving a flap between a first position and a second position based on the temperature of the ambient airflow.

10. The method according to claim 9, wherein the controlling the bypass mechanism comprises exposing the secondary heat exchanger to the cooling airflow when the flap is in the first position and isolating the secondary heat exchanger from the cooling airflow when the flap is in the second position.

11. The method according to claim 10, wherein the exposing the secondary heat exchanger to the cooling airflow comprises moving the flap to the first position when the temperature of the ambient airflow is greater than the threshold temperature, and wherein isolating the secondary heat exchanger from the cooling airflow comprises moving the flap to the second position when the temperature of the ambient airflow is less than the threshold temperature.

12. The method according to claim 11, wherein the threshold temperature of the ambient airflow is at least 105° F. (40.5° C.).

13. The method according to claim 8, wherein the controlling the bypass mechanism comprises exposing the secondary heat exchanger to the cooling airflow in response to the temperature of the ambient airflow being greater than the threshold temperature, wherein the threshold temperature of the ambient airflow is at least 105° F. (40° 5C).

14. The method according to claim 8, further comprising coupling the primary heat exchanger to the fan casing of the gas turbine engine and coupling the secondary heat exchanger to the core section of the gas turbine engine.

15. The method according to claim 8, wherein the channeling the heat transfer fluid through the primary heat exchanger comprises further channeling the heat transfer fluid through a surface cooler.

16. The method according to claim 8, wherein the controlling the bypass mechanism to selectively position the secondary heat exchanger in the cooling airflow comprises further controlling a bypass flap to selectively channel the cooling airflow through a brick cooler.

* * * * *